Patented July 29, 1952

2,605,279

UNITED STATES PATENT OFFICE 2,605,279

PROCESS FOR PURIFICATION OF PARATHION

Fred I. Edwards, Washington, D. C., and Stanley A. Hall, Mount Rainier, Md.

No Drawing. Application May 24, 1950, Serial No. 164,024

9 Claims. (Cl. 260—461)

(Granted under the act of March 3, 1883, as amended April 30, 1928; 370 O. G. 757)

The invention herein described may be manufactured and used by or for the Government of the United States of America for governmental purposes throughout the world without the payment to us of any royalty thereon.

We hereby dedicate the invention herein described to the free use of the people in the territory of the United States to take effect upon the granting of a patent to us.

This invention relates to parathion, an insecticidal material known as O,O-diethyl O-p-nitrophenyl thiophosphate and having the formula

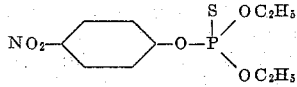

and more particularly to a process of purifying commercial and technical parathion to produce an odorless and substantially pure parathion.

Impure parathion, as for example, commercial and technical parathion, ordinarily contains p-nitrophenol as its major impurity. This impurity is the primary cause of plant injury when commercial parathion is applied to foliage. Consequently, its removal is desired when parathion is used for insect control on plants. Other impurities which may be present in commercial or technical parathion, depending upon the method of preparation of this technical material, are dichloroazobenzene, O-ethyl O,O - bis(p - nitrophenyl) thiophosphate, O,O,O - tris(p - nitrophenyl) thiophosphate, O,O,O-triethyl thiophosphate, ethyl chlorothiophosphate, diethyl chlorothiophosphate, ethyl bis(p-nitrophenyl) phosphate, tri(p-nitrophenyl) phosphate, diethyl p-nitrophenyl phosphate, triethyl phosphate, ethyl chlorophosphate, diethyl chlorophosphate, and related phosphorus and sulfur compounds.

According to the invention, a process is provided which involves washing impure parathion with a low-boiling aliphatic hydrocarbon fraction having a boiling point of less than 120° C., such as petroleum ether, dissolving the parathion in a solvent therefor which is immiscible with water, such as diethyl ether, and washing the resulting parathion solution with an aqueous alkaline solution having a pH not exceeding about 11 to remove color, this washing being preferably accomplished by employing an aqueous solution of a moderately alkaline material, such as sodium carbonate and sodium bicarbonate. In this washing step, which effects removal of the nitrophenol impurity, the washing produces a mixture of a lower aqueous layer and an upper layer of the parathion in solution in the water-immiscible solvent, and is continued, while continually drawing off the lower aqueous layer, until this layer is, preferably, colorless. The parathion solution is then dried, as for example, over anhydrous sodium sulfate, and contacted with an adsorbent, preferably a clay such as attapulgite, bentonite, and montmorillonite, to remove substantially all odor and substantially all the remaining impurities. Such contacting may be by filtration, preferably, in which case it is desirable to employ a bulking agent, such as diatomaceous earth, as a filtering aid, the proportion of about 1 part of the bulking agent to about 2 parts of the adsorbent being satisfactory. The contacting may also be effected by intimately mixing the parathion solution with the adsorbent and centrifuging the mixture, in which case the use of a bulking agent is unnecessary. The parathion is then separated from the adsorbent in the form of an oily yellow liquid and may be used as such since it is substantially pure. If desired, it may be further purified by subjection to crystallization and recrystallization at low temperatures, preferably about —15° C., to isolate the parathion in the form of almost colorless needles. This crystallization procedure, in addition to isolating the parathion, has the additional effect in that it removes the dichloroazobenzene impurity.

The following examples are illustrative of the invention:

*Example I*

A 30 gram sample of technical parathion was washed by decantation with small portions of petroleum ether, using a total of 200 ml. of wash, after which the parathion was dissolved in 50 ml. of diethyl ether. The ether solution of parathion was then washed with 25 ml. portions of 10 percent sodium carbonate solution, each of these washings producing a mixture of an upper diethyl ether layer of parathion and a lower aqueous layer, the latter layer being continually drawn off. These washings were continued until the lower aqueous layer was colorless, this requiring 200 ml. of the wash solution. The diethyl ether solution of the parathion was dried over anhydrous sodium sulfate and finally passed through a plug of dried cotton. The dried ether solution was then filtered, using mild suction, through a column (8 cm. long by 3 cm. dia.) containing a mixture of 2 parts of an attapulgite clay and 1 part of a diatomaceous earth, previously made wet with diethyl ether. The diethyl ether was removed on the steam bath and the last traces were removed by a stream of dried nitrogen, leaving a yellow oily residue.

The residue was dissolved in 25 ml. of diethyl ether and petroleum ether was then added at room temperature to the point of incipient turbidity. This solution was kept at a temperature of —15° C. for 12 hours. At the end of this time, there was a mass of almost colorless needles which were freed from the amber mother liquor by decantation and washed twice with 10 ml. portions of a precooled mixed solvent consisting of equal parts of petroleum ether and diethyl ether. The crystals were taken up in about 50 ml. of diethyl ether, dried over anhydrous sodium sulfate, and passed through dried cotton. The diethyl ether was removed on the steam bath, and the last traces of solvent were removed by a current of dried nitrogen. The parathion thus obtained (about 5 grams) was a very pale yellow liquid without odor, which crystallized into almost colorless long needles melting sharply at 6° C.

Anal.: Calc. for $C_{10}H_{14}NO_5PS$—C, 41.23; H, 4.85; N, 4.81; P, 10.64; S, 11.01. Found—C, 41.42; H, 4.76; N, 4.94; P, 10.75; S, 11.35.

Example II

Identical results were obtained following the procedure of Example I but using bentonite for the attapulgite clay of that example.

Example III

Identical results were obtained following the procedure of Example I but using montmorillonite and 300 ml. of sodium bicarbonate solution instead of attapulgite and 200 ml. of sodium carbonate solution, respectively, of that example.

Example IV

The identical procedure of Example I was followed except that in the crystallization and recrystallization, the yellow oily residue was dissolved in twice its volume of absolute methanol, or other alkanol, such as ethanol and propanol, instead of the diethyl ether and petroleum ether of Example I, and the needles, freed from the amber mother liquor, were washed with the corresponding precooled lower alkanol instead of the precooled mixed solvent consisting of diethyl ether and petroleum ether. The results were similar to those of Example I.

The above examples are for illustration only and are not intended to limt this invention as to the adsorbents, the solvents, the wash solutions, the amounts of these materials, or the temperatures used in this purification. This method of purification, although used for the purification of small amounts of parathion, is also applicable on a large scale.

We claim:

1. A process comprising washing impure parathion with a low-boiling aliphatic hydrocarbon fraction having a boiling point of less than 120° C., dissolving the washed, impure parathion in a solvent therefor which is immiscible with water, washing the resulting parathion solution with an aqueous alkaline solution having a pH not exceeding about 11 to remove color, contacting the parathion solution with an adsorbent selected from the group consisting of attapulgite, bentonite, and montmorillonite clays to remove substantially all odor and remaining impurities, and separating the resulting substantially pure parathion from the adsorbent.

2. The process of claim 1 wherein the low-boiling hydrocarbon fraction is petroleum ether.

3. The process of claim 1 wherein the parathion solvent is diethyl ether.

4. The process of claim 1 wherein the aqueous alkaline solution is an aqueous solution of sodium carbonate.

5. The process of claim 1 wherein the adsorbent is attapulgite clay.

6. The process of claim 1 wherein the adsorbent is bentonite clay.

7. The process of claim 1 wherein the adsorbent is montmorillonite clay.

8. The process of claim 1 wherein the contacting is effected by filtration and diatomaceous earth is employed as a filtering aid.

9. A process comprising washing impure parathion with a low-boiling aliphatic hydrocarbon fraction having a boiling point of less than 120° C., dissolving the washed, impure parathion in a solvent therefor which is immiscible with water, washing the resulting parathion solution with an aqueous alkaline solution having a pH not exceeding about 11 to remove color, contacting the parathion solution with an adsorbent selected from the group consisting of attapulgite, bentonite, and montmorillonite clays to remove substantially all odor and remaining impurities, separating the resulting substantially pure parathion from the adsorbent, and further purifying the parathion by subjecting it to crystallization and recrystallization procedures at low temperatures.

FRED I. EDWARDS.
STANLEY A. HALL.

REFERENCES CITED

The following references are of record in the file of this patent:

UNITED STATES PATENTS

| Number | Name | Date |
|---|---|---|
| 1,931,056 | Clemmensen | Oct. 17, 1933 |
| 2,059,912 | Reid | Nov. 3, 1936 |

OTHER REFERENCES

John A. Fletcher et al., J. Am. Chem. Soc., vol. 70 (1948), pages 3943 and 3944.

Morton, Laboratory Technique in Organic Chemistry (1st ed., 1938), pages 182, 183 and 187.